United States Patent [19]

Bhat et al.

[11] Patent Number: 4,640,693

[45] Date of Patent: Feb. 3, 1987

[54] COATED SILICON NITRIDE CUTTING TOOL AND PROCESS FOR MAKING

[75] Inventors: Deepak G. Bhat, Troy; Dhirajlal C. Shah, Sterling Hgts.; John R. Kyle, Troy; Paul F. Woerner, Grosse Pointe Farm, all of Mich.

[73] Assignee: GTE Valeron, Troy, Mich.

[21] Appl. No.: 723,222

[22] Filed: Apr. 15, 1985

[51] Int. Cl.$^4$ ............................................. B24D 11/00
[52] U.S. Cl. ..................................... 51/295; 51/308; 51/309
[58] Field of Search .......................... 51/295, 309, 308

[56] References Cited

U.S. PATENT DOCUMENTS

| | | | |
|---|---|---|---|
| 4,406,667 | 9/1983 | Sarin et al. | 51/295 |
| 4,406,668 | 9/1983 | Sarin et al. | 51/295 |
| 4,409,003 | 10/1983 | Sarin et al. | 51/295 |
| 4,409,004 | 10/1983 | Sarin et al. | 51/295 |
| 4,421,525 | 12/1983 | Sarin et al. | 51/309 |
| 4,431,431 | 2/1984 | Sarin et al. | 51/295 |
| 4,433,979 | 2/1984 | Sarin et al. | 51/309 |
| 4,440,547 | 4/1984 | Sarin et al. | 51/309 |
| 4,441,894 | 4/1984 | Sarin et al. | 51/295 |
| 4,449,989 | 5/1984 | Sarin et al. | 51/309 |
| 4,469,489 | 9/1984 | Sarin et al. | 51/295 |

*Primary Examiner*—Paul Lieberman
*Assistant Examiner*—Willie J. Thompson
*Attorney, Agent, or Firm*—Robert E. Walter

[57] ABSTRACT

A coated ceramic silicon nitride cutting tool comprises a substrate having a major portion by volume silicon nitride, a coating of refractory material thereon, and an interfacial layer intermediate between the substrate and the layer of refractory material. The interfacial layer comprises a refractory metal chemically reacted to form a reaction bonded refractory metal nitride for enhancing the adherence of the layer of refractory metal material to the substrate. The interfacial layer is provided by reacting a refractory metal halide with the surface to form a reaction bonded refractory metal nitride.

40 Claims, No Drawings

COATED SILICON NITRIDE CUTTING TOOL AND PROCESS FOR MAKING

FIELD OF INVENTION

The present invention relates to processes for forming an adherent coating of a refractory metal material or composition on a substrate which has utility as a cutting tool.

PRIOR ART

Cemented carbide cutting tools are widely used in metal cutting application owing to their unique properties of high hardness, toughness, strength and wear resistance. It is known that the wear resistance of cemented carbide materials can be further improved by applying a thin layer of a coating of a refractory compound such as titanium carbide, titanium nitride, aluminum oxide and combinations thereof. Such coatings have widened the application range of cemented carbide tools.

Advances in metal working equipment manufacture, and economic necessities of higher productivity have combined to put greater demands of improved performance on the cutting tool materials. At higher cutting speeds, the chemical inertness of a cemented carbide tool as well as its strength are compromised due to higher temperatures generated from high speed machining. Even with coatings of refractory compounds such as aluminum oxide, the cemented carbide cutting tools have reached the useful limit due to thermal deformation of the tool tip, resulting in poor machining performance and tool life.

Conventional ceramic cutting tools such as aluminum oxide, aluminum oxide/titanium carbide composites and the like overcome many of these problems because of their superior thermal deformation resistance. They, however, suffer from low impact strength and fracture toughness.

Silicon nitride based cutting tool materials are found to have superior fracture toughness compared to alumina-based cutting tools, but show lower chemical wear resistance when cutting steel.

The following patents to Buljan et al all relate to the coating silicon nitride based cutting tools with coatings of carbides, nitrides and carbonitrides of titanium hafnium, and zirconium, as well as with aluminum oxide. These patents are U.S. Pat. Nos. 4,406,669, 4,409,004, 4,409,003, 4,416,678, 4,421,525, 4,424,066, 4,426,209, 4,431,431, 4,440,547, 4,441,894, and 4,449,989.

U.S. Pat. Nos. 4,406,667, 4,406,668 and 4,406,670 to Buljan et al, in particular, relate to the formation of a refractory metal nitride coated cutting tool. As set forth therein, titanium nitride layers are formed on the silicon nitride cutting tool by passing a gaseous mixture of titanium tetrachloride, a gaseous nitrogen source such as nitrogen or ammonia, and hydrogen over the substrate at appropriate temperatures.

SUMMARY OF THE INVENTION

When coating a silicon nitride substrate by the chemical vapor deposition technique at high temperatures, considerable tensile stresses are developed in the coating at the cutting edge when the tool is cooled to room temperature from the deposition temperature making it difficult to consistently achieve strongly adherent coatings.

The process of the present invention initiates a surface layer on the surface of the silicon nitride substrate to be coated prior to coating with the carbides, nitrides and carbonitrides of titanium hafnium, and zirconium, as well as aluminum oxide for enhancing the adherence of the coating.

In accordance with the present invention, there is provided a coated ceramic silicon nitride cutting tool comprising a substrate which comprises a major portion by volume silicon nitride and a coating of refractory material thereon. An interfacial layer is provided intermediate to the substrate and the layer of refractory material. The interfacial layer comprises a refractory metal chemically reacted to form a reaction bonded refractory metal nitride for enhancing the adherence of the layer of refractory metal material to the substrate. In accordance with a further aspect of the present invention, the interfacial layer is provided by reacting a refractory metal halide with the surface to form a refractory metal nitride.

DETAILED DESCRIPTION

The substrate body of the coated silicon nitride cutting tool of the present invention possesses a microstructure comprising a silicon nitride granular phase and an intergranular matrix phase. The intergranular matrix phase comprises silicon nitride and an effective amount of a densification aid selected from the group consisting of aluminum oxide, silicon dioxide, yttrium oxide, hafnium oxide, zirconium oxide, the lanthanide rare earth oxides, and mixtures thereof. The cutting tool substrates may contain additional phases in the form of intentional or unintentional additives. Such additional phases may include hard refractory particles. The particles may have a wide particle distribution resulting from the presence of milling medium or may represent a controlled additive in a predetermined amount with a predetermined particle distribution.

The intergranular matrix phase is essentially continuous and preferably substantially homogeneous. It is considered important to incorporate into the intergranular phase of the substrate body a densification aid which permits densification to densities approaching theoretical, and at the same time does not deleteriously affect the high temperature strength and creep resistance of the overall composite. Typical densification aids useful for this purpose are metal oxides selected from silicon dioxide, aluminum oxide, magnesium oxide, yttrium oxide, zirconium oxide, hafnium oxide, the lanthanide rare earth oxides, and mixtures thereof. Yttrium oxide is a preferred densification aid. Preferably the metal oxide densification aid is employed in an amount from about 3 to about 25 weight percent of the substrate body. More preferably the densification aid is present in an amount from about 4 to about 18 percent by weight.

Certain impurities and additives present in the overall composite substrate body tend to concentrate in the intergranular phase during the densifying process. Such further additional materials are preferably present in amounts less than about 5 weight percent of the matrix phase.

In addition to the matrix phase and silicon nitride phases hereinbefore discussed, the substrate may contain additional phases in the form of particles of hard refractory material which may be present, as previously mentioned, as an additive. By the term hard refractory material as used throughout this specification, it is meant any carbide and/or nitride and/or carbonitride of a refractory metal, including mixtures and solid solutions thereof. Particular refractory metals include titanium, vanadium, chromium, zirconium, niobium, molybdenum, hafnium, tantalum and tungsten which from the carbides, nitrides and solid solutions referred to. The additional phases of hard refractory material are preferably less than about 20 percent by weight.

In accordance with the principles of the present invention, the substrate surface is reacted with a refractory metal halide to form an interfacial layer comprising a refractory metal chemically reacted to form a refractory metal nitride. The reactive gas is preferably titanium tetrachloride although it is contemplated that other refractory metal halide gases may be suitable. It is believed that the titanium tetrachloride reacts with the silicon nitride surface according to the following reaction.

$$Si_3N_4(s) + 4TiCl_4(g) + 2H_2(g) \rightarrow 4TiN(s) + 3SiCl_4(g) + 4HCl(g)$$

The gaseous reaction mixture may also include an inert gas. The reaction gas is characterized by the absence of a carbon or nitrogen source which would preferentially react with the titanium chloride. Preferably the temperatures employed are from about 900 degrees centigrade to about 1600 degrees centigrade and preferably from about 1200 to about 1400 degrees centigrade.

The reaction is preferably carried out under suitable conditions so that substantially all the titanium nitride present at the surface after reaction is formed by the reaction of silicon nitride in the substrate and the titanium chloride gas. The process of the present invention can be typically carried out in apparatus suited for typical vapor deposition reactions. The reactant gases are passed over a substrate in a reaction zone. The temperature of the reaction zone, and of the substrate surface, as well as the total flow and composition of the gas phase over the substrate are so selected as to allow the reaction between the gas and the substrate surface to proceed according to the thermodynamic principles. The total flow conditions and the total gas pressure are so selected as to allow the products of the reaction to be removed continuously from the reaction zone. The resulting coating is preferably uniform and homogeneous. The interfacial coating is preferably at least about one micron in thickness and more preferably from about 2 to about 5 microns in thickness.

The substrate having the interfacial layer, may be conveniently coated with a refractory metal composition according to techniques known in the prior art. The layer of refractory material is selected from the group consisting of metal oxides such as aluminum oxide, refractory metal carbides, refractory metal nitrides, refractory metal carbonitrides, and/or combinations of the above.

EXAMPLES

SUBSTRATE PREPARATION

The following techniques are illustrated of a method of preparing the substrates. Substrates may be conveniently prepared by cold pressing followed by sintering, hot isostatic pressing, and over pressure sintering and other techniques known in the art.

The substrates may be conveniently prepared according to the following technique. A powder mixture of silicon nitride, metal oxide densification aid and any additional hard refractory materials are mixed according to the proper proportions depending on the desired final composition. To one part by weight of the above mixture is added about 2.5 parts by weight toluene, 0.1 parts by weight of methanol, and about 0.05 parts by weight of steric acid. The resulting slurry is thoroughly mixed by ball milling and then dried at 75 degrees centigrade. The resulting dry mixture is ball milled for about 24 hours and then mixed with about 0.05 parts by weight of a copolymer of polyethylene glycol and methoxypolyethylene glycol, 1 part by weight toluene, and about 0.05 parts by weight methanol. This mixture is mixed by ball milling for about 15 minutes, dried at 75 degrees centigrade and then screened through a 60 mesh screen. The $-60$ mesh fraction is pressed at ambient temperatures at a pressure of about 25,000 psig to obtain a green compact. The residual solvents and stearic acid binder are removed from the green compact by heating at about 600 degrees centigrade in an inert atmosphere. According to one method, the green compact is then sintered to a hard, highly densified composite body by heating at a temperature of between about 1700 and about 1850 degrees centigrade. According to another method, the $-60$ mesh portion prior to obtaining a green compact is pressed at a pressure of about 3000 psig and a temperature of about 1700 degrees centigrade to produce a hard, highly densified composite body. This latter method which requires the simultaneous application of high temperatures and heat is hereinafter referred to as hot pressing. The resulting hot pressed bodies may have a high proportion of silicon nitride present as beta-silicon nitride.

Preparation of Interfacial Layer

The detailed procedure for preparing the interfacial layer is described in the Examples 1-7. The preferred substrate composition comprises from about 10 to about 30 percent by weight matrix phase and additional phases. It is believed that ingredients present on the surface in addition to silicon nitride tend to catalyze the reaction of titanium chloride and promote the formation of reacted titanium nitride.

Preparation of Refractory Material Coating

The substrate bodies having an interfacial layer is coated with aluminum oxide by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated substrate together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is often added to insure that the reaction takes place in reducing atmsophere.

$$2AlCl_3 + 3H_2O_3 + 6HCl$$

The substrate piece or pieces are heated to a temperature between about 800 degrees C. to about 1500 degrees C. and the gaseous mixture is passed over the heated substrate until the desired coating thickness is achieved.

As an example, titanium carbide layers are formed on the silicon nitride substrate having the interfacial layer by passing titanium tetrachloride, a gaseous carbon source such as methane, and hydrogen over the substrate at a temperature of between about 800 degrees C. and 1500 degrees C. The reaction is described by the following equation, although hydrogen is often added to insure that the reaction takes place in a reducing environment.

$$TiCl_4 + CH_4 \rightarrow TiC + 4HCl$$

Similarly, titanium nitride layers may be formed according to the following reaction.

$$2TiCl_4 + N_2 + 4H_2 \rightarrow 2TiN + 8HCl$$

Similarly, a layer of titanium carbonitride may be formed by a combination of the above reactions wherein both a carbon and nitrogen source are present in the reaction gases in a desired proportion. It is also contemplated that titanium in the above reactions may be substituted with a suitable refractory metal halide. Typical refractory metals include titanium, vanadium, chromium, zirconium, niobium, molybdenum, hafnium, tantalum and tungsten. Titanium and hafnium are preferred.

EXAMPLE 1

Substates of hot-pressed silicon nitride are placed in a graphite resistance heated furncace at about 1350° C. A mixture of gases consisting of titanium chloride, hydrogen, and argon is introduced into the furnace, and the reaction is allowed to occur for about thirty minutes. The samples show the presence of a gold-colored deposit, about 3 microns in thickness. X-ray diffraction analysis of the coating shows that it is titanium nitride.

EXAMPLE 2

The procedure in Example 1 is carried out except that the temperature is about 1100° C. and the time is 60 minutes. A gold-colored deposit of titanium nitride is obtained of about 1 micron in thickness. Metallographic examination of cross-section shows that uniform coverage of the surface is not achieved in some cases. This is probably because the reaction time is too short to completely react with the surface.

EXAMPLE 3

The procedure in Example 1 is carried out except that the temperature is about 1100° C. and the time is 4 hours. A gold-colored deposit of titanium nitride about 2.5 microns thick is obtained.

EXAMPLE 4

The procedure in Example 3 is carried out. Silicon nitride substrates having various compositions shown in Table 1 are used. Following the process described in Example 3, a coating of titanium nitride is deposited using conventional flow of gases consisting of titanium chloride, nitrogen and hydrogen.

TABLE 1

| | COMPOSITIONS OF SILICON-NITRIDE BASE CUTTING TOOL INSERTS | | | | | | |
|---|---|---|---|---|---|---|---|
| DESIG- | NOMINAL COMPOSITION, Weight % | | | | | | |
| NATION | $Y_2O_3$ | $Al_2O_3$ | TiN | TiC | SiC | AlN | $Si_3N_4$ |
| SN-5B | 6.1 | 3.8 | — | — | — | 5.4 | Balance |
| SN-9 | 7.5 | 2.0 | — | 2.0 | — | — | Balance |
| SN-13 | 8.0 | 2.5 | — | — | — | — | Balance |
| SN-14 | 7.5 | 2.0 | 2.0 | — | — | — | Balance |
| SN-15 | 7.5 | 2.0 | — | — | 2.0 | — | Balance |
| SN-16 | 7.5 | 2.0 | — | — | 20.0 | — | Balance |
| SN-17 | 7.5 | 2.0 | — | 30.0 | — | — | Balance |
| SN-18 | 6.0 | 1.0 | — | — | — | — | Balance |
| SN-20 | 7.5 | 2.0 | — | 39.0 | — | — | Balance |

EXAMPLE 5

The procedure in Example 3 is carried out. Silicon nitride substrates having various compositions shown in Table 1 are used. Following the process described in Example 3, a coating of titanium carbide is deposited using conventional flows of gases consisting of titanium chloride, methane, argon, and hydrogen.

EXAMPLE 6

The procedure in Example 3 is carried out. Silicon nitride substrates having various compositions as shown in Table 1 are used. Following the process described in example 3, a coating of titanium carbide is deposited using conventional flows of gases comprising titanium chloride, methane, argon, and hydrogen. Following the titanium carbide deposition, a coating of aluminum oxide is deposited using conventional flows of aluminum chloride gas, carbon dioxide, hydrogen and argon.

EXAMPLE 7

The procedure in Example 3 is carried out, except that the temperature is about 1175° C. and the time is about 4 hours. Following this, a coating of aluminum oxide is deposited using conventional flows of aluminum chloride, carbon dioxide, argon, and hydrogen.

EXAMPLE 8

The conventional titanium nitride coating is deposited on SN-13 using standard flows of titanium chloride, nitrogen, and hydrogen.

Coated articles prepared in the aforementioned examples are tested for machining performance. The machining test consists of facing a clean 7" diameter bar of 4140 steel having a hardness of 192 BHN. The machining parameters are about 1600 surface feet per minute, about 0.060 inch depth of cut and about 0.012 inch per revolution. The number of cuts made in facing the bar from about 7" to about 2" diameter is recorded for each article. The failure criterion is usually flank wear in excess of about 0.0150", unless excessive chipping or crater wear occurs earlier.

It is clearly evident that the application of the interlayer of TiN, as described in Example 1, significantly improves the machining performance of silicon nitride base cutting tools. It is found that uncoated inserts wear out within a single cut, whereas coated inserts show improved performance. The insert of Example 8 failed in one cut due to excessive spalling and wear, indicating that the direct deposition of TiN, without the interlayer results in poor adhesion and poor performance. It is believed that the demonstrated poor adhesion is partly due to excessive residual stress from the mismatch of thermal expansion coefficient, and to the absence of any chemical bonding.

Furthermore, it can be seen, for SN-13, that the application of the interlayer in accordance with the process of Example 1 improves the life of subsequently TiN-coated insert. Similar results are obtained for other cutting tool materials described in this disclosure. On the basis of examples cited, herein, various other modifications of this process will become apparent to those skilled in the art having the benefit of the present disclosure. Such other modifications are intended to fall within the scope of the appended claims.

While there have been shown and described what are at present considered the preferred embodiments of the invention, it will be obvious to those skilled in the art that various changes and modifications may be made therein without departing from the scope of the invention as defined by the appended claims.

What is claimed is:

1. A coated ceramic silicon nitride cutting tool comprising a substrate comprising a major portion by volume of silicon nitride, a layer of refractory material, and an interfacial layer intermediate said substrate and said layer of refractory material, said interfacial layer comprising a refractory metal chemically reacted to form a reaction bonded refractory metal nitride for enhancing the adherence of said layer of refractory metal material to said substrate.

2. A coated ceramic silicon nitride cutting tool according to claim 1 wherein said refractory metal nitride is titanium nitride.

3. A coated ceramic silicon nitride cutting tool according to claim 2 wherein said layer of refractory material is selected from the group consisting of refractory metal oxides, refractory metal carbides, refractory metal nitrides, or refractory metal carbonitrides and combinations of the above.

4. A coated ceramic silicon nitride cutting tool according to claim 3 wherein said layer of refractory material is selected from the group consisting of refractory metal carbides, refractory metal nitrides or refractory metal carbonitrides.

5. A coated ceramic silicon nitride cutting tool according to claim 4 wherein said refractory metal is titanium.

6. A coated ceramic silicon nitride cutting tool according to claim 2 wherein said substrate comprises a silicon nitride phase and a matrix phase including a densification aid selected from the group consisting of silicon dioxide, aluminum oxide, magnesium oxide, yttrium oxide, hafnium oxide, zirconium oxide, the lanthanide rare earth oxides, and mixtures thereof.

7. A coated ceramic silicon nitride cutting tool according to claim 6 wherein at least a portion of said silicon nitride is beta-silicon nitride.

8. A coated ceramic silicon nitride cutting tool according to claim 7 wherein said substrate is prepared by hot pressing, hot isostatic pressing, cold pressing followed by sintering, or over pressure sintering.

9. A coated ceramic silicon nitride cutting tool according to claim 8 wherein said layer of refractory material is selected from the group consisting of refractory metal oxides, refractory metal carbides, refractory metal nitrides or refractory metal carbonitrides.

10. A coated ceramic silicon nitride cutting tool according to claim 9 wherein said layer of refractory material is selected from the group consisting of refractory metal carbides, refractory metal nitrides or refractory metal carbonitrides.

11. A coated ceramic silicon nitride cutting tool according to claim 10 wherein said refractory metal is titanium.

12. A coated ceramic silicon nitride cutting tool according to claim 7 wherein said substrate comprises an addition phase comprising particles of a hard refractory material.

13. A coated ceramic silicon nitride cutting tool according to claim 12 wherein said layer of refractory material is selected from the group consisting of refractory metal oxides, refractory metal carbides, refractory metal nitrides or refractory metal carbonitrides.

14. A coated ceramic silicon nitride cutting tool according to claim 13 wherein said layer of refractory material is selected from the group consisting of refractory metal carbides, refractory metal nitrides or refractory metal carbonitrides.

15. A coated ceramic silicon nitride cutting tool according to claim 14 wherein said refractory metal is titanium.

16. A coated ceramic silicon nitride cutting tool according to claim 12 wherein said additional phase or said matrix phase includes reaction enhancing materials.

17. A coated ceramic silicon nitride cutting tool according to claim 16 wherein said reaction enhancing materials tend to catalyze the formation of said refractory metal nitride.

18. A coated ceramic silicon nitride cutting tool according to claim 17 wherein said layer of refractory material is selected from the group consisting of refractory metal oxides, refractory metal carbides, refractory metal nitrides or refractory metal carbonitrides.

19. A coated ceramic silicon nitride cutting tool according to claim 18 wherein said layer of refractory material is selected from the group consisting of refractory metal carbides, refractory metal nitrides or refractory metal carbonitrides.

20. A coated ceramic silicon nitride cutting tool according to claim 19 wherein said refractory metal is titanium.

21. A process for producing a ceramic silicon nitride cutting tool coated with a refractory material comprising reacting a refractory metal halide with a surface portion of a substrate comprising a major portion by volume silicon nitride to form an interfacial layer comprising a refractory metal chemically reacted to form a reaction bonded refractory metal nitride directly adjacent said substrate for enhancing the adherence of said refractory metal material to said substrate, said formation of said interfacial layer being carried out prior to forming said coating of said refractory material.

22. A process for producing a coated ceramic silicon nitride cutting tool according to claim 21 wherein said refractory metal halide is titanium halide.

23. A process for producing a coated ceramic silicon nitride cutting tool according to claim 22 wherein said layer of refractory material is selected from the group consisting of refractory metal oxides, refractory metal carbides, refractory metal nitrides or refractory metal carbonitrides.

24. A process for producing a coated ceramic silicon nitride cutting tool according to claim 23 wherein said layer of refractory metal carbides, refractory metal nitrides or refractory metal carbonitrides.

25. A process for producing a coated ceramic silicon nitride cutting tool according to claim 24 wherein said refractory metal is titanium.

26. A process for producing a coated ceramic silicon nitride cutting tool according to claim 22 wherein said substrate comprises a silicon nitride phase and a matrix phase including a densification aid selected from the group consisting of silicon dioxide, aluminum oxide, magnesium oxide, yttrium oxide, hafnium oxide, zirconium oxide, the lanthanide rare earth oxides, and mixtures thereof.

27. A process for producing a coated ceramic silicon nitride cutting tool according to claim 26 wherein at least a portion of said silicon nitride is beta-silicon nitride.

28. A process for producing a coated ceramic silicon nitride cutting tool according to claim 27 wherein said substrate is prepared by hot pressing, hot isostatic pressing, cold pressing followed by sintering, or overpressure sintering.

29. A process for producing a coated ceramic silicon nitride cutting tool according to claim 28 wherein said layer of refractory material is selected from the group consisting of refractory metal oxides, refractory metal carbides, refractory metal nitrides or refractory metal carbonitrides.

30. A process for producing a coated ceramic silicon nitride cutting tool according to claim 29 wherein said layer of refractory material is selected from the group consisting of refractory metal carbides, refractory metal nitrides or refractory metal carbonitrides.

31. A process for producing a coated ceramic silicon nitride cutting tool according to claim 30 wherein said refractory metal is titanium.

32. A process for producing a coated ceramic silicon nitride cutting tool according to claim 27 wherein said substrate comprises an addition phase comprising particles of a hard refractory material.

33. A process for producing a coated ceramic silicon nitride cutting tool according to claim 32 wherein said layer of refractory material is selected from the group consisting of refractory metal oxides, refractory metal carbides, refractory metal nitrides or refractory metal carbonitrides.

34. A process for producing a coated ceramic silicon nitride cutting tool according to claim 33 wherein said layer of refractory material is selected from the group consisting of refractory metal carbides, refractory metal nitrides or refractory metal carbonitrides.

35. A process for producing a coated ceramic silicon nitride cutting tool according to claim 34 wherein said refractory metal is titanium.

36. A process for producing a coated ceramic silicon nitride cutting tool according to claim 32 wherein said additional phase or said matrix phase includes reaction enhancing materials.

37. A process for producing a coated ceramic silicon nitride cutting tool according to claim 36 wherein said reaction enhancing materials tend to catalyze the formation of said refractory metal nitride.

38. A process for producing a coated ceramic silicon nitride cutting tool according to claim 37 wherein said layer of refractory material is selected from the group consisting of refractory metal oxides, refractory metal carbides, refractory metal nitrides or refractory metal carbonitrides.

39. A process for producing a coated ceramic silicon nitride cutting tool according to claim 38 wherein said layer of refractory material is selected from the group consisting of refractory metal carbides, refractory metal nitrides or refractory metal carbonitrides.

40. A process for producing a coated silicon nitride cutting tool according to claim 39 wherein said refractory metal is titanium.

* * * * *